(12) United States Patent
Griffin

(10) Patent No.: US 6,783,017 B2
(45) Date of Patent: Aug. 31, 2004

(54) CONTAINER LID AND BAGEL HOLDER

(76) Inventor: Matthew L. Griffin, 2021 Burch Dr., Indianapolis, IN (US) 46220

( * ) Notice: Subject to any disclaimer, the term of this patent is extended or adjusted under 35 U.S.C. 154(b) by 0 days.

(21) Appl. No.: 10/219,974

(22) Filed: Aug. 15, 2002

(65) Prior Publication Data

US 2003/0034352 A1 Feb. 20, 2003

Related U.S. Application Data

(60) Provisional application No. 60/312,343, filed on Aug. 15, 2001.

(51) Int. Cl.[7] .......................... B65D 85/36; B65D 85/74
(52) U.S. Cl. ................... 220/212; 206/541; 220/23.86; 426/115
(58) Field of Search ................................ 220/212, 521, 220/23.86, 23.6; 215/228; 206/541, 217, 216, 508; 426/115, 120, 124, 129

(56) References Cited

U.S. PATENT DOCUMENTS

| 2,604,976 | A | * | 7/1952 | Sarg | 220/521 |
| 2,766,796 | A | * | 10/1956 | Tupper | 220/521 |
| 4,018,355 | A | * | 4/1977 | Ando | 220/522 |
| 5,180,079 | A | * | 1/1993 | Jeng | 220/212 |
| 5,531,347 | A | * | 7/1996 | Goulding | 220/212 |
| 5,657,895 | A | * | 8/1997 | Rogge | 220/796 |
| 6,474,494 | B1 | * | 11/2002 | Miller | 206/217 |
| 6,514,548 | B2 | * | 2/2003 | Lin | 206/541 |

* cited by examiner

Primary Examiner—Nathan J. Newhouse

(57) ABSTRACT

A dual functioning lid that seals a container using a container sealing lip (10), and holds a bagel using a bagel steadying lip (20) and a bagel steadying protrusion (30), allowing the user's hand to be insulated from a hot bagel while applying an edible spread to the bagel.

1 Claim, 3 Drawing Sheets

CONTAINER LID AND BAGEL HOLDER

CROSS-REFERENCE TO RELATED APPLICATIONS

This application is entitled to the benefit of Provisional Patent Application Ser. No. 60/312,343 filed Aug. 15, 2001.

BACKGROUND

1. Field of the Invention

This invention relates to kitchenware, specifically to a container lid that has the dual purpose of sealing a container and holding a bagel steady while an edible spread is applied to the bagel.

2. Discussion of Prior Art

After toasting, a bagel can be very hot, and thus difficult to handle. It is when the bagel is still hot that most people wish to apply an edible spread (cream cheese, butter, etc) to the bagel. However, it is difficult to hold the bagel steady while applying the edible spread, in that the bagel is hot to the touch.

Currently, existing bagel holders serve the purpose of holding a bagel for slicing. There are no holders that serve the purpose of holding a bagel steady for the application of edible spreads, or for holding hot bagels.

Currently, lids that seal edible spread containers serve only the purpose of sealing the edible spread container.

SUMMARY

This invention is a container lid that is shaped to both seal a food container, as well as hold a bagel steady for the purpose of applying an edible spread, thus keeping a person's hand insulated from the hot bagel while applying the spread, said container lid/bagel holder comprising (a) a container lid of predetermined material said lid having one side that is formed to seal an appropriately sized container and one side having a raised lip and a center protrusion that steadies a bagel when that bagel is placed upon the lid, within the raised lip, and when the center protrusion is inserted into the bagel's hole. Whereby having the function to both seal a container, and hold a bagel steady while an edible spread is being applied to said bagel.

OBJECTS AND ADVANTAGES

Accordingly, the advantage of my invention is:

(a) My lid can seal a container (cream cheese, butter, preserves etc.) and can also be used as a bagel holder that steadies a bagel while an edible spread is being applied to it. A person that uses the bagel holder insulates their hand from a hot bagel while applying an edible spread to the bagel because their hand is not in direct contact with the hot bagel.

DRAWING FIGURES

In the drawings, closely related figures have the same number but different alphabetic suffixes.

REFERENCE NUMERALS IN DRAWINGS

10 Container Sealing Lip
20 Bagel Steadying Lip
30 Bagel Steadying Protrusion

DESCRIPTION OF INVENTION

Figure 1:
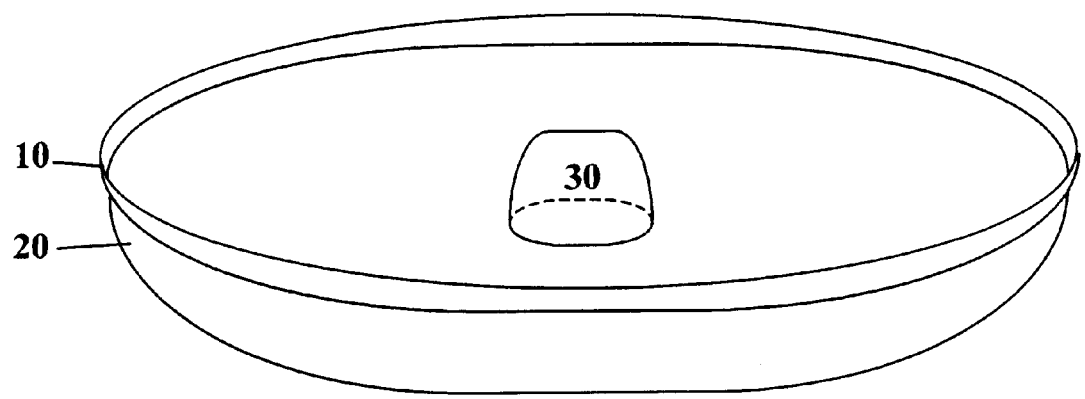
FIG. 1 shows a perspective view of the Container Lid and Bagel Holder
Figure 2:
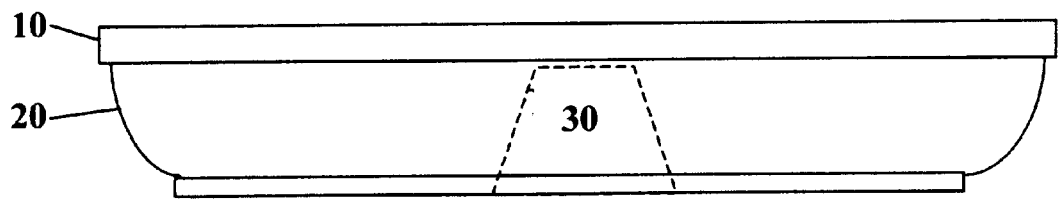
FIG. 2 shows an elevation view of the Container Lid and Bagel Holder.
Figure 3A:
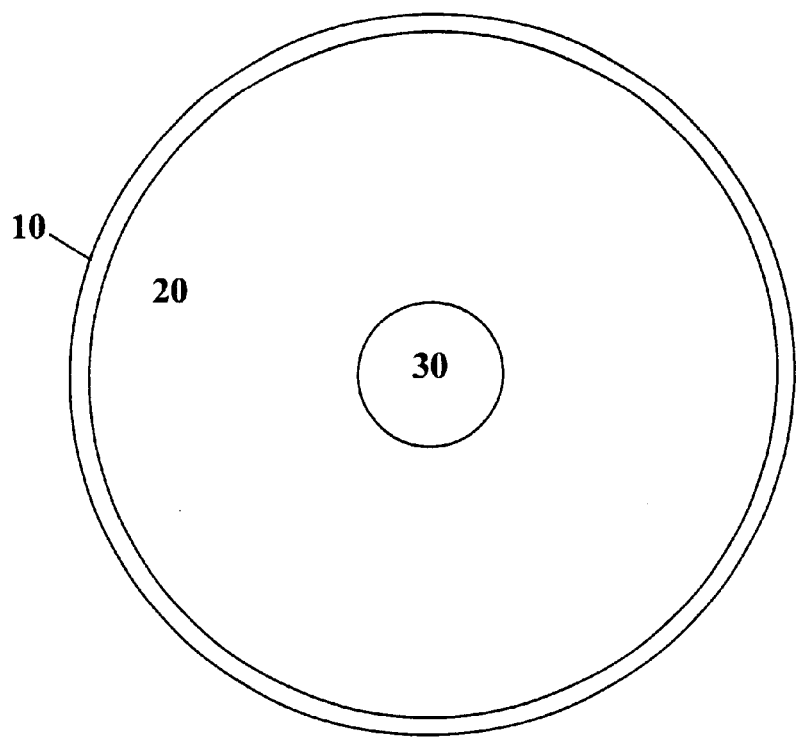
FIGS. 3A and 3B show plan views of the Container Lid and Bagel Holder.
Figure 3B:
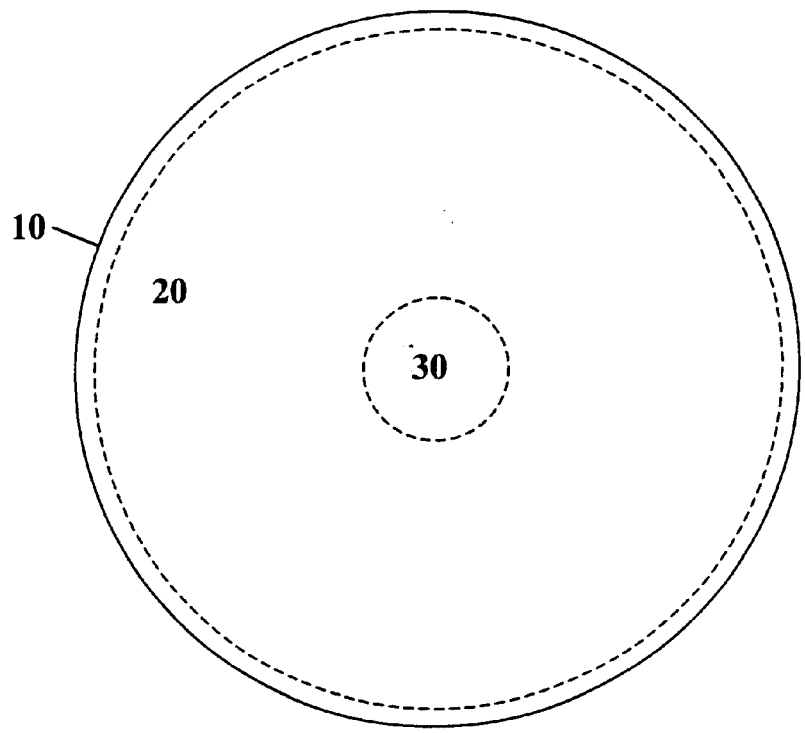
Figure 4A:
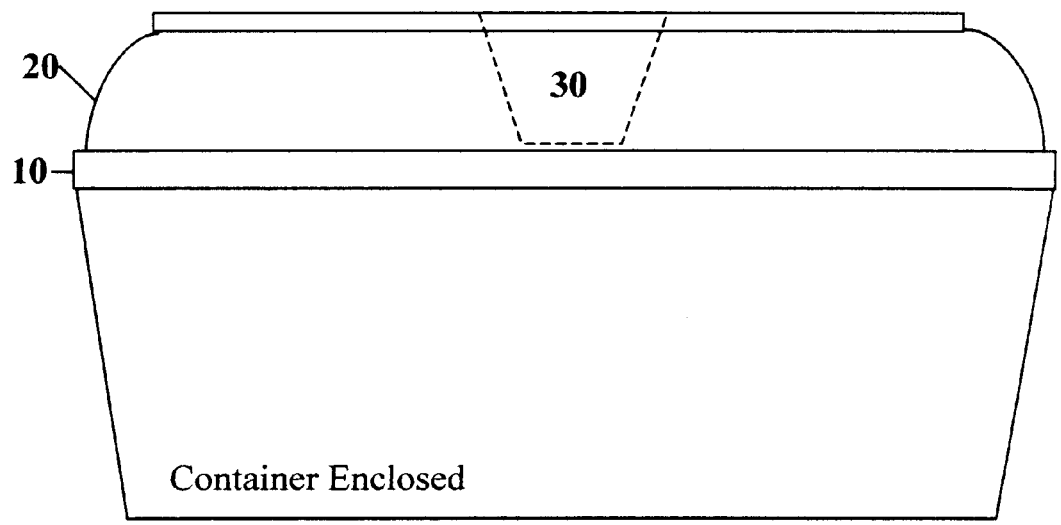
FIGS. 4A and 4B show illustrative views of the Container Lid and Bagel Holder
Figure 4B:
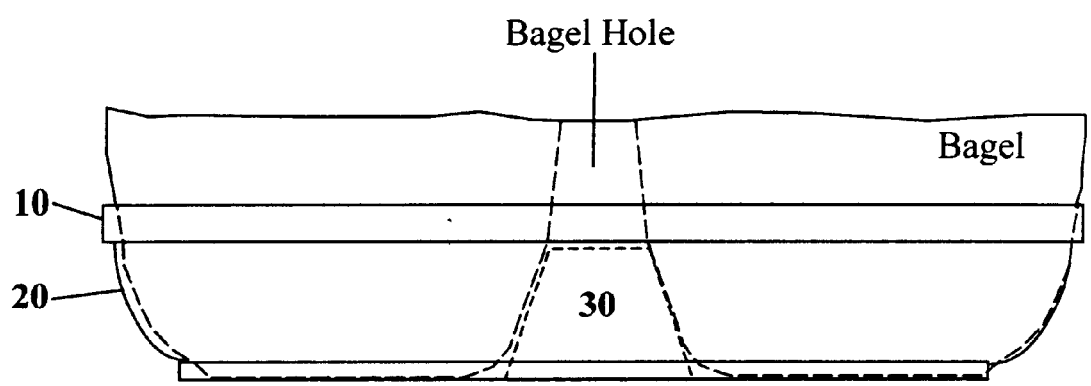

A preferred embodiment of the Container Lid and Bagel Holder is illustrated in FIG. 1 (perspective view), FIG. 2 (elevation view), FIGS. 3A and 3B (plan views), and FIGS. 4A and 4B (illustrative views). It is a molded plastic lid with the same plastic thickness as existing lids that are used to seal edible spread containers. It is circular and measures 4 and ⅛ inches in diameter. It has an outer container sealing lip 10 (1) around the lid's outer circumference that extends ¼ inch from a bagel steadying lip 20 (1). The bagel steadying lip is circular, and concave from the lid's outer circumference, creating a dish like shape. From the container sealing lip, the bagel steadying lip is concave to a depth of ½ inch. In the center of the lid, on the same side as the container sealing lip and the bagel steadying lip, is a bagel steadying protrusion 30 (1). This protrusion is a conic hump that is ⅜ inches in total height, and begins as a circular raise with a radius ¼ inches from the lid center point.

Operation of Invention

The Container Lid and Bagel Holder is operated by placing it atop an appropriately sized container and pressing down, so as to seal said container, functioning as a lid. To be operated for the purpose of holding a bagel, the lid is hand held, protrusion side up, and a bagel is placed atop the lid so that the bagel fits within the bagel steadying lip 20, shown in FIGS. 1, 2, 3A–B, and 4A–B and the bagel steadying protrusion 30, shown in FIGS. 1, 2, 3A–B, and 4A–B extends into the bagel's hole.

Conclusion, Ramifications, and Scope of Invention

Thus the reader will see that the Container Lid and Bagel Holder both seals a container and holds a bagel steady for the purposes of applying an edible spread to the bagel and protecting the user from direct skin contact with a hot bagel while applying an edible spread to the bagel.

While my above description contains many specifications, these should not be construed as limitations on the scope of the invention, but rather as an exemplification of one preferred embodiment thereof. Many other variations are possible.

For example, the lid/bagel holder can have:

The lid can be made of different materials such as metal, ceramic, etc.;

The lid can have different dimensions such as 7 inches in diameter, 6 inches in diameter etc.;

The lid's sealing lip, bagel steadying lip, and bagel steadying protrusion can have different dimensions such as different heights (¼ inch, ⅖ inch etc.) and diameters (3 inches, 4 inches etc.);

The lid sealing lip, and bagel steadying lip and steadying protrusion can be located on opposite sides of the lid;

A different mechanism for stabilizing the bagel such a small inner lip on a flat lid to hold a bagel, or only having a center protrusion, etc.

Accordingly, the scope of the invention should be determined not by the embodiment(s) illustrated, but by the appended claims and their legal equivalents.

I claim:
1. A kitchenware lid for a container comprising:
a one piece lid of insulating material having a top, a container sealing lip and a bagel gripping surface, said surface extending upwardly from the container sealing lip to the top of the lid and is curved, the top has a truncated conically shaped bagel protrusion extending downward; wherein the lid can be removed and inverted from a closing position where the lid closes the container to be a hand held insulated bagel gripper where the curved bagel gripping surface is concave for holding the outer circumference of a bagel with the bagel protrusion extending into the hole of the bagel to steady the bagel.

* * * * *